United States Patent [19]

Lystad

[11] 3,834,080
[45] Sept. 10, 1974

[54] WINDOW REGULATOR FOR A STATION WAGON TAILGATE WINDOW

[75] Inventor: Leonard A. Lystad, Warren, Mich.

[73] Assignee: General Motors Corporation, Detroit, Mich.

[22] Filed: May 2, 1973

[21] Appl. No.: 356,302

[52] U.S. Cl. .................................... 49/348, 49/352
[51] Int. Cl. ........................................... E05f 11/38
[58] Field of Search ............ 49/227, 164, 169, 348, 49/349, 360, 352, 325, 40

[56] References Cited
UNITED STATES PATENTS

| | | | |
|---|---|---|---|
| 2,528,145 | 10/1950 | Horton | 49/349 X |
| 2,615,711 | 10/1952 | Niquette | 49/349 X |
| 3,035,829 | 5/1962 | Stotz | 49/325 X |
| 3,702,041 | 11/1972 | Podolan | 49/348 |

*Primary Examiner*—J. Karl Bell
*Attorney, Agent, or Firm*—J. A. Kushman

[57] ABSTRACT

A regulator for controlling movement of a station wagon tailgate window between lower and upper positions and utilizing an elongated helical spring encircling an elongated rod of the regulator drive train to counterbalance the window. The rod and spring extend laterally of the vehicle and the ends of the rod are respectively fixed to a pair of control members rotatably supported by a pair of associated housings for movement about a common axis. A pair of drive tapes are passed over the respective control members in driving engagement therewith and define inverted U-shaped configurations in cooperation with guides receiving the ends of the tapes. Laterally spaced lower portions of the window are attached to respective ends of the tapes so that the window is raised and lowered as the control members are rotated by a manually operable one way spring clutch. The elongated helical spring has one of its ends fixed to one of the control members and its other end fixed to the housing associated with the other control member so as to provide the counterbalancing for the window during its movement between the lower and upper positions.

3 Claims, 4 Drawing Figures

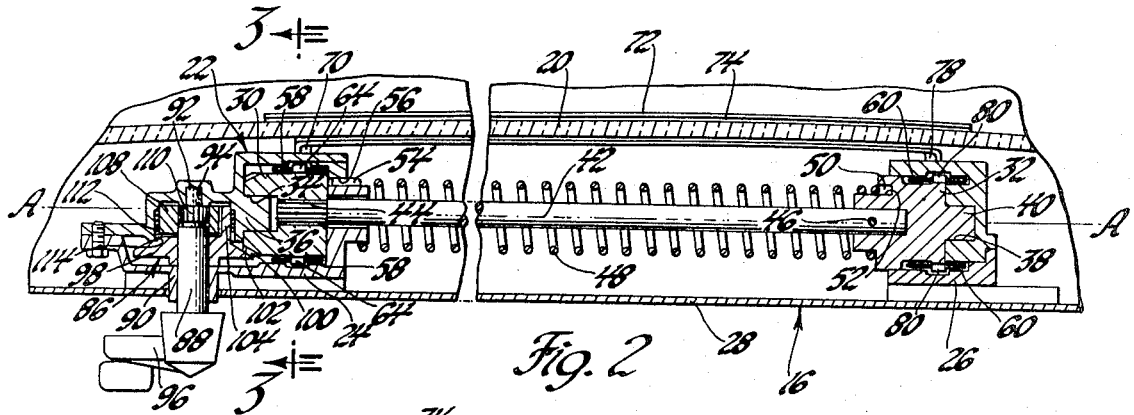
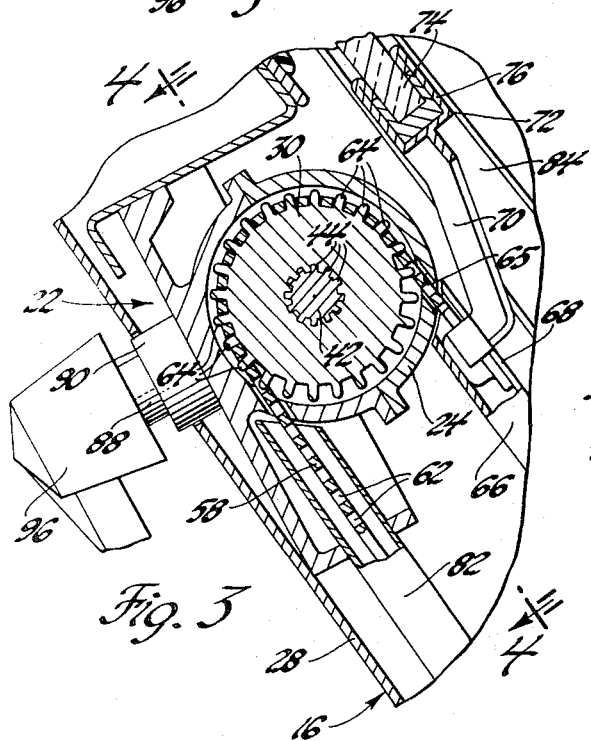
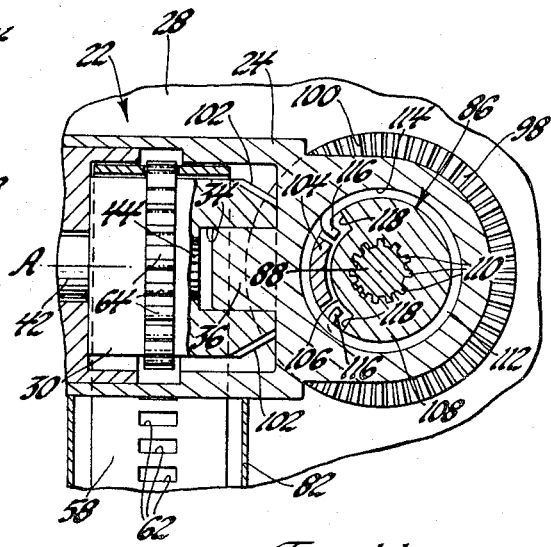

WINDOW REGULATOR FOR A STATION WAGON TAILGATE WINDOW

BACKGROUND OF THE INVENTION

This invention relates generally to a window regulator for controlling movement of a station wagon tailgate window between lower and upper positions to selectively close and open the upper portion of the rear station wagon opening with the tailgate in closed position.

Station wagon type vehicle bodies conventionally include a rear opening for allowing rear access to the vehicle body occupant compartment. A tailgate is conventionally movable between open and closed positions with respect to a lower portion of the opening, and the tailgate conventionally carries a window movable between lower and raised positions to selectively close and open the upper portion of the rear opening above the closed tailgate. It is thus necessary for the tailgate to include a regulator for controlling movement of the window between its positions. While the driving force for this regulator must overcome the force of gravity during the upward movement of the window, gravity will lessen the force necessary to drive the window downwardly to its opened position. Thus, different forces are necessary to drive the regulator in opposite directions.

SUMMARY OF THE INVENTION

The present invention provides a regulator for controlling movement of a station wagon tailgate window between its lower and upper positions and includes an elongated helical spring encircling an elongated rod of the regulator drive train to counterbalance the window so that the forces necessary to drive the window in either direction are generally the same. The rod and spring extend laterally of the vehicle and the ends of the rod are respectively fixed to a pair of control members respectively supported by a pair of housings for rotational movement about a common axis. A pair of apertured drive tapes are passed over the control members in inverted U-shaped configurations with their apertures receiving driving projections on the control members. A pair of drive tape guides are respectively associated with each housing and slidably receive and dispense the opposite ends of the tape during rotary movement of the control members in either direction. Laterally spaced lower portions of the window are attached to ends of the tape so that the window is moved vertically as the control members rotate. One end of the elongated helical spring is fixed to one of the control members while the other spring end is secured to the housing associated with the other control member to thus provide the counterbalancing of the window as it moves between the upper and lower positions to open or close the upper portion of the station wagon opening above the closed tailgate. A manually driven one way spring clutch includes a gear drive for rotating the control members to thus raise and lower the window; however, this clutch prevents movement of the window when a force is applied directly to the window.

BRIEF DESCRIPTION OF THE DRAWINGS

The objects, features, and advantages of the present invention are readily apparent from the following detailed description of the preferred embodiment and the drawings in which:

FIG. 2 is a partially broken away sectional view taken along line 2—2 of FIG. 1, and shows a helical spring of the window regulator which provides a counterbalance for the window;

FIG. 3 is a sectional view of the window regulator taken generally along line 3—3 of FIG. 2, and shows the driving connection between the window and the regulator; and FIG. 4 is a sectional view of the window regulator taken generally along line 4—4 of FIG. 3, and shows a one way spring clutch of the regulator that prevents window movement when a force is applied directly to the window.

DETAILED DESCRIPTION OF THE PREFERRED EMBODIMENT

Figure 1:
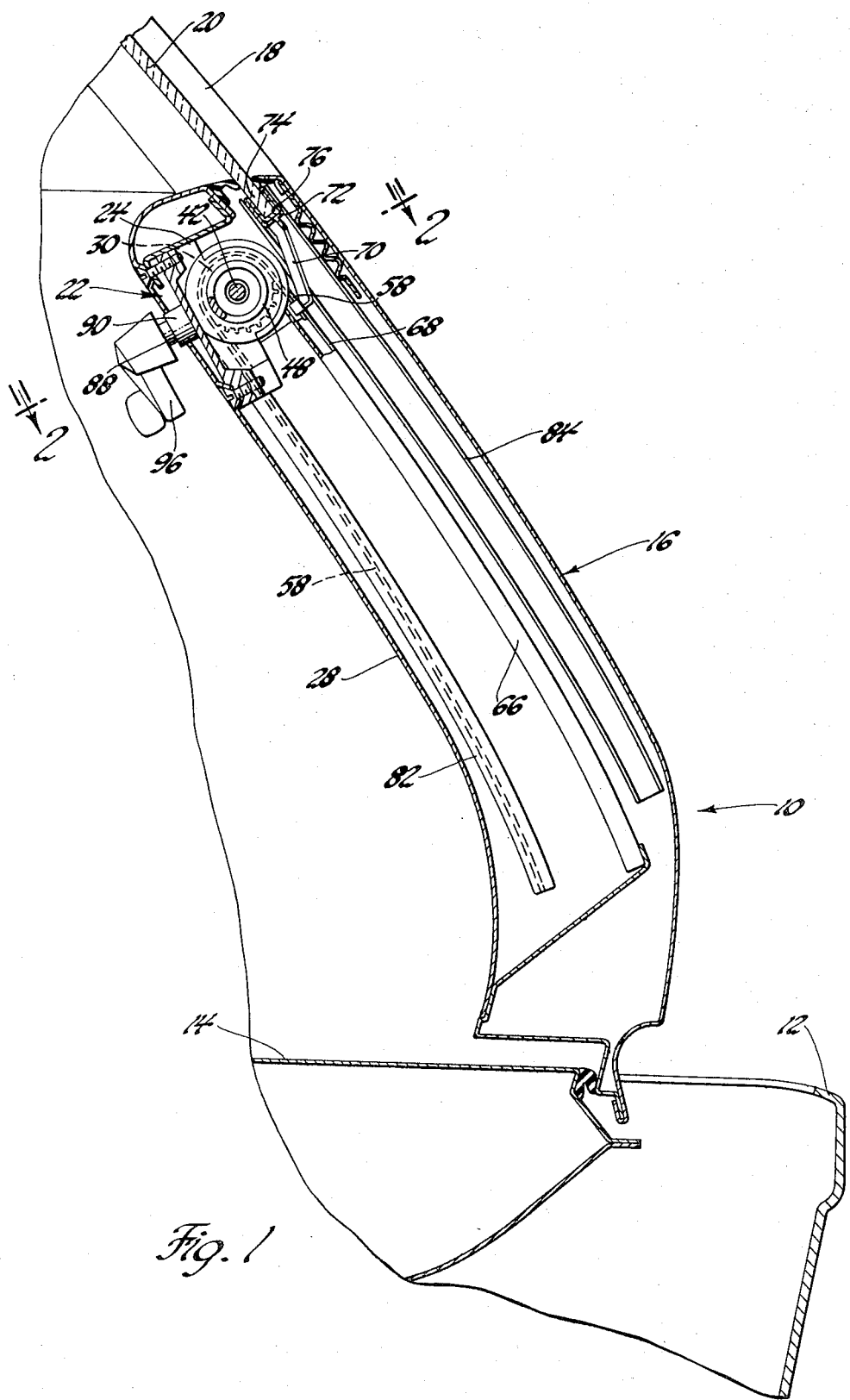
FIG. 1 is a partially broken away sectional view taken through a rear portion of a station wagon type vehicle body and its associated tailgate along a vertical plane extending longitudinally of the vehicle, and shows a window regulator, according to this invention, for controlling movement of the window associated with the tailgate.

Referring to FIG. 1 of the drawings, the rear portion of a station wagon type vehicle body 10 is shown as including a rear bumper 12 located just rearward of the cargo floor 14 and below a tailgate generally indicated by 16. Window frame portions 18, only one of which is shown, extend upwardly and forwardly from each lateral upper edge portion of the tailgate and are joined at their upper end by a window frame portion, not shown, extending laterally of the vehicle to cooperate with these other frame portions in defining an opening for the tailgate window 20. This upper window frame portion is pivoted to the upper roof portion of the vehicle which defines the upper portion of the rear tailgate opening so that the tailgate is movable about a transverse vehicle axis from the lower closed position shown to an upper open position in what is generally referred to as a lift-gate mode of movement.

A window regulator 22, according to this invention, is manually operable to move window 20 between the upper position shown in FIG. 1 and a lower storage position within the tailgate to selectively open the upper portion of the tailgate opening when the tailgate 16 is in closed position. As can be seen by additionally referring to FIG. 2 of the drawings, the window regulator includes a pair of housings 24 and 26 suitably mounted on the inner panel 28 of the tailgate in laterally spaced relationship relative to the vehicle body, and preferably located equidistant from the opposite lateral edges of the tailgate. A pair of rotatable control members 30 and 32 are respectively associated with housings 24 and 26, and are rotatably supported thereby for movement about a common axis A. Control member 30 includes a round aperture 34 receiving a round support portion 36 of housing 24, and housing 26 includes a round aperture 38 receiving a round support portion 40 of the control member 32 to thus rotatably support the control members for movement about their common rotational axis.

An elongated member or rod 42 extends laterally of the vehicle body between the control members 30 and 32. One end of rod 42 is fixed relative to control member 30 by way of splines 44, see also FIG. 3, while the other end of rod 42 is fixed relative to control member 32 by a pin 46 to thus synchronize the rotary movement of these control members. The rod 42 is encircled by an elongated helical spring 48 that also extends laterally of the vehicle body. One end 50 of the spring 48 is turned to extend along the longitudinal axis of the spring and is received by an aperture 52 in control member 32 to thus fix this end of the spring for rotational movement with this control member. The other end 54 of spring 48 is also turned to extend along the longitudinal axis of the spring and is received within an aperture 56 in the window regulator housing 24 to thus fix this end of the spring against rotational movement during the rotational movement of control members 30 and 32. As will subsequently become apparent, the manner in which one end of this spring 48 is fixed while the other end rotates with the control members provides a counterbalance for window 20.

The rotatable control members 30 and 32 are respectively connected to the tailgate window 20 by way of flexible drive tapes 58 and 60. These drive tapes are each passed over their respective control members so as to define inverted U-shaped configurations, as can be seen in FIGS. 1 and 3 where drive tape 58 is shown. Apertures 62 in drive tape 58, see FIGS. 3 and 4, receive integral driving projections 64 that are circumferentially spaced on control member 30 extending radially relative to the rotational axis A of the control member 30. Rotational movement of this control member thus increases the length of drive tape 58 on one side of this control member while decreasing the length of this tape on the other side of this control member, with the direction of rotation determining which side is increased and which is decreased.

The length of drive tape 58 on the rearward side of control member 30, generally to the right in FIG. 3, extends outwardly of housing 24 through an aperture 65 and is received within a drive tape guide 66 that is mounted on the tailgate in the orientation generally shown in FIG. 1. This tape guide includes a slot 68 extending along the length of the guide on its rearward wall and this slot slidably receives the lower end of a window bracket leg 70 which is suitably fixed to the end of the drive tape 58 within tape guide 66. The upper end of leg 70 carries a window bracket 72 that supports the lower edge portion 74 of window 20 by way of a U-shaped resilient member 76. The window bracket 72 extends laterally of the vehicle body as can be seen in FIG. 2, and is supported at its end opposite leg 70 by way of a leg 78 similar to leg 70. The lower end of leg 78 is slidably received by a drive tape guide not shown by the drawings but similar to the drive tape guide 66 associated with bracket leg 70. Within this tape guide associated with bracket leg 78, the adjacent end of drive tape 60 is suitably connected thereto in the same manner drive tape 58 is connected to bracket leg 70. The control member 32 also includes driving projections 80 received by apertures in drive tape 60 in the same manner as control member 30 and drive tape 58. The lengths of the drive tapes on the forward sides of control members 30 and 32 are also received by drive tape guides, the one of which is associated with control member 30 being indicated by 82 in FIGS. 1, 3, and 4, and the other one of which is not shown.

Vertical movement of window 20 will now be described with reference to FIG. 3 where control member 30 and drive tape 58 are shown, it being understood that control member 32 and drive tape 60 function in a similar manner. When the window 20 is in its upper position shown in FIG. 1, the control member 30 and drive tape 58 assume their relative positions shown in FIG. 3 with the window bracket 72 adjacent this control member. When control member 30 is driven in a clockwise direction as in FIG. 3 by a drive means that will subsequently be described, the drive tape 58 is pulled from tape guide 82 and driven downward into tape guide 66 so as to cooperate with the force of gravity in moving the window bracket 72 and window 20 downwardly. A window guide 84 slidably guides each lateral edge portion of the window 20 as it moves downwardly, and when the window reaches a lower stored position generally within tailgate 16, the relative lengths of tape 58 on the opposite sides of control member 30 will be the reverse of that shown in FIG. 1 where the window is in its upper or closed position. Upward movement of the window is achieved by driving control member 30 in a counterclockwise direction to pull the window bracket leg 70 upwardly and thus raise the window.

During the vertical movement of the window, the attachment of spring 48 to control member 32 with the other end of the spring fixed to housing 24 causes the spring to wind and unwind and counterbalance the window against the force of gravity. As the window moves downwardly aided by this gravity force, the spring 48 is wound about the elongated rod 42 to store energy. When the window moves upwardly, this energy is released and a portion of the energy necessary to raise the window is thus provided. The spring 48 thus functions as an effective counterbalance for the window and the rod 42 not only synchronizes the control members 30 and 32 but also positions the spring as it winds and unwinds to provide this counterbalance.

The rotational movement of the control members 30 and 32 is provided by a manually operable one way spring clutch best seen in FIGS. 2 and 4 and indicated by 86. FIG. 2 shows that a drive shaft 88 of the clutch is rotatably supported within the window regulator housing 24 by way of an annular flange 90 and a round end portion 92 of the shaft which is received by a round aperture 94 in the housing. A manually operable handle 96 is secured to the other end portion of the shaft 88 so as to allow manually actuated shaft rotation relative to housing 24. A gear member 98 is received by an intermediate portion of shaft 88 for limited rotation relative to the shaft. This gear member includes a frustoconical gear face 100 which meshes with a cooperable frustoconical gear face 102 on control member 30 to rotate control member 30 about axis A during rotation of the gear member about the longitudinal axis of shaft 88. The gear member includes a drive projection 104 which, as seen in FIG. 4, has an arcuate cross section and is received within a slot 106 in a drive member 108 secured to drive shaft 88 by way of splines 110. A helical spring 112 is tightly received within an annular aperture 114 in housing 24 and encircles drive member 108 in a concentric relationship with shaft 88. Each end 116 of this spring is turned inwardly and is received within slot 106 in drive member 108 generally adjacent a respective end 118 of this slot.

When handle 96 is rotated so as to raise or lower the tailgate window 20, drive shaft 88 rotates drive member 108 and moves one of the ends 118 of slot 106 into engagement with the adjacent spring end 116. The direction of this rotation, of course, determines which one of the two spring ends is engaged. This engagement tends to decrease the diameter of spring 112 so that the spring and the drive member 108 are freely rotatable within the aperture 114 in housing 24. During the initial stages of this rotation, the end of the spring which is engaged by its adjacent slot end moves into engagement with the drive projection 104 on the gear member 98 to thus rotate the gear member 108. The meshing gear faces 100 and 102 rotate control member 30 as the gear member 98 is rotated and the rod 42 concomitantly rotates the control member 32 so as to drive the tapes 58 and 60 in the manner previously described and thus raise or lower window 20.

If a force is applied directly to window 20 so as to attempt upward or downward window movement, the drive tapes will begin rotating the control members 30 and 32 and, by way of the meshing gear faces 100 and 102, will also begin to rotate the gear member 98. Drive projection 104 on the gear member engages one of the ends 116 of spring 112 as the gear member begins to rotate, and tends to enlarge the diameter of the spring. This enlargement of the spring locks the spring against rotation within the aperture 114 in housing 24 and prevents window movement. Thus, if the counterbalance for window 20 provided by helical spring 48 is slightly over or under balanced, the one way drive feature of clutch 86 in this manner prevents window movement and insures that the window will remain in any position it is adjusted to by manual control of handle 96.

It is believed evident from the foregoing description that this invention provides an improved window regulator for a station wagon tailgate window.

What is claimed is:

1. In a station wagon type vehicle body including a rearwardly facing opening for providing rear access to the occupant compartment of the vehicle body, a tailgate movable between open and closed positions with respect to a lower portion of the opening, and a window mounted by the tailgate for movement between lower and upper positions to selectively open and close the upper portion of the opening when the tailgate is in closed position, a regulator for the window comprising, first and second housings mounted on the tailgate in laterally spaced relationship relative to the vehicle, first and second control members respectively mounted by the first and second housings for rotational movement about a common axis, elongated means extending laterally of the vehicle between the control members so as to connect these control members for rotational movement with each other, elongated first and second flexible members having respective ends attached to laterally spaced lower portions of the window, the first and second flexible members being respectively associated with the first and second control members so as to raise the window in response to rotational movement of these control members in a first direction about their common rotational axis and so as to lower the window in response to rotational movement of these control members in a second direction opposite to the first direction, driving means for selectively rotating the control members in either direction to selectively raise or lower the window, and a helical spring encircling the elongated means with one end of the spring fixed relative to one of the housings and with the other end of the spring fixed to the control member associated with the other housing so as to provide a counterbalance for the window during movement thereof between the upper and lower positions.

2. In a station wagon type vehicle body including a rearwardly facing opening for providing rear access to the occupant compartment of the vehicle body, a tailgate movable between open and closed positions with respect to a lower portion of the opening, and a window mounted by the tailgate for movement between lower and upper positions to selectively open and close the upper portion of the opening when the tailgate is in closed position, a regulator for the window comprising, first and second housings mounted on the tailgate in laterally spaced relationship relative to the vehicle, first and second control members respectively mounted by the first and second housings for rotational movement about a common axis, the control members including annular driving portions concentric with their common axis of rotation, an elongated rod extending laterally of the vehicle between the control members so as to connect these control members for rotational movement with each other, elongated first and second flexible members having respective ends attached to laterally spaced lower portions of the window, the first and second flexible members being respectively passed over the driving portions of the first and second control members in inverted generally U-shaped configurations so as to raise the window in response to rotational movement of these control members in a first direction about their common rotational axis and so as to lower the window in response to rotational movement of these control members in a second direction opposite to the first direction, manually operable means for rotating the control members in either direction to thereby raise or lower the window, and a helical spring encircling the elongated rod with one end of the spring fixed to one of the housings and with the other end of the spring fixed to the control member associated with the other housing so as to provide a counterbalance for the window during movement thereof between the upper and lower positions.

3. In a station wagon type vehicle body including a rearwardly facing opening for providing rear access to the occupant compartment of the vehicle body, a tailgate movable between open and closed positions with respect to a lower portion of the opening, and a window mounted by the tailgate for movement between lower and upper positions to selectively open and close the upper portion of the opening when the tailgate is in closed position, a regulator for the window comprising, first and second housings mounted on the tailgate in laterally spaced relationship relative to the vehicle, first and second control members respectively mounted by the first and second housings for rotational movement about a common axis, the control members including annular driving portions concentric with their common axis of rotation and the driving portions having circumferentially spaced driving projections extending radially outward from this axis, one of the control members including gearing means, an elongated rod extending laterally of the vehicle between the control members so as to connect these control members for rotational movement with each other, elongated first and second flexible members with longitudinally spaced apertures, the flexible members having respective ends attached to laterally spaced lower portions of the window and being passed over the annular driving portions of the control members in inverted generally U-shaped configurations so as to register the driving projections of the driving portions and the apertures in the flexible members and to thereby lengthen and shorten the respective ends of the flexible members on each side of the control members in response to rotational movement of these control members, the flexible members raising the window during rotational movement of the control members in a first direction of rotation about their common axis and lowering the window in response to rotational movement of these members in a second direction opposite to the first direction, a pair of guides associated with each of the control members so as to receive respective ends of the flexible members as these flexible members move over the control members and to thereby store these flexible members in each adjusted position of the window, manually operable gearing means for driving the gearing means on the one control member to thereby rotate the control members and raise or lower the window, the manually operable gearing means including a one way spring clutch means for preventing window movement under the impetus of a force applied to the window, and a helical spring encircling the elongated rod with one end of the spring fixed to one of the housings and with the other end of the spring fixed to the control member associated with the other housing so as to provide a counterbalance for the window during movement thereof between the upper and lower positions.

* * * * *